United States Patent [19]

Weyers

[11] 3,831,616
[45] Aug. 27, 1974

[54] NOVEL LIQUID CONTROL SYSTEM
[75] Inventor: Hugo Jozef Weyers, Bornem, Belgium
[73] Assignee: Parke, Davis & Company, Detroit, Mich.
[22] Filed: Sept. 13, 1972
[21] Appl. No.: 288,698

[30] Foreign Application Priority Data
Mar. 13, 1972  Belgium .............................. 115038

[52] U.S. Cl.......................... 137/92, 118/7, 425/145
[51] Int. Cl...................... B29c 13/00, G05d 24/00
[58] Field of Search ................ 137/4, 92; 73/54, 59; 425/269, 270, 271, 272, 273, 274, 145; 118/7

[56] References Cited
UNITED STATES PATENTS
2,597,138  5/1952  Trigg................................. 137/82 X
2,614,583  10/1952  DiMaggio ............................ 137/82
2,773,507  12/1956  Norris................................... 137/92
2,917,065  12/1959  Monk.................................... 137/92
3,070,110  12/1962  Lund et al. ........................ 73/54 X
3,532,102  10/1970  Glassey............................ 137/92 X
3,632,700  1/1972  Oglevee ......................... 425/269 X
3,727,452  4/1973  Kenyon................................. 73/59

Primary Examiner—Robert G. Nilson

[57] ABSTRACT

An automatic viscosity control system is provided for maintaining a predetermined target viscosity range for pharmaceutical capsule dipping solution used for making capsules by the dip-molding technic. The system comprises means for measuring and amplifying abnormal change in viscosity expressed as an analog and converting the analog to a digital signal for incorporating digital increments of water into the dipping solution as required for viscosity control.

3 Claims, 1 Drawing Figure

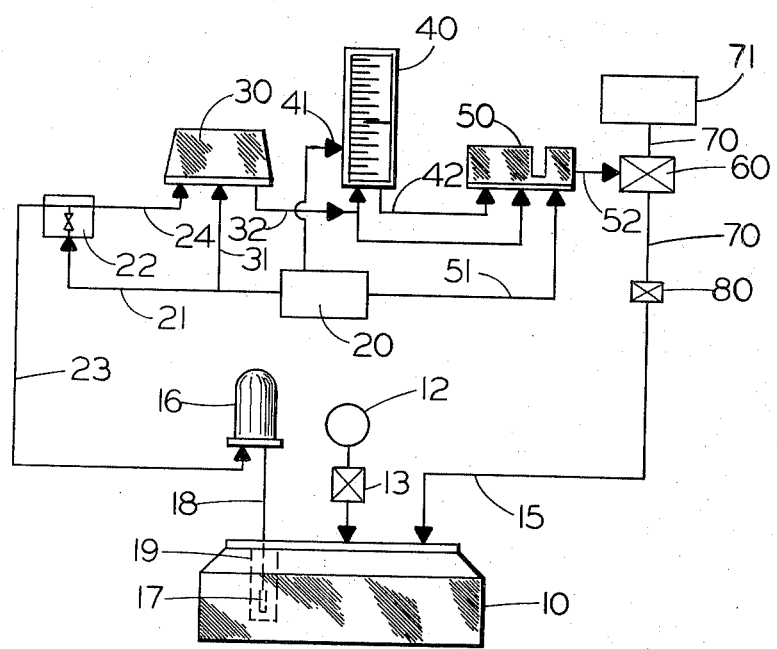

NOVEL LIQUID CONTROL SYSTEM

SUMMARY AND DETAILED DESCRIPTION

This invention relates to automatic viscosity control system means and more particularly to such a system employed in automatic production of pharmaceutical capsules by the dip-molding technic.

As is known, the automatic production of capsules involves dipping capsule mold pins into a bath of viscous film-forming dipping solution, withdrawing and drying the fresh film formed on the pins, and stripping, cutting and joining the capsule parts to provide telescopically joined capsules. For this purpose the dipping solution commonly employed is aqueous gelatin solution having a viscosity within a range making for uniform wall thickness in the finished capsules. One difficulty with the method, however, is that the operating conditions are subject to considerable change so that the dipping solution viscosity from time to time may be outside the desired viscosity range. This can be due to any of a number of factors such as adverse thermal effects, insufficient mixing, abnormal gelatin concentration, etc.

It is therefore an object of the present invention to provide means for continuous measurement of the viscosity of the dipping solution and to control in response to measured requirements the addition of water to the dipping dish.

It is also an object of the invention to provide automatic means for maintaining uniform viscosity in the dipping dish for purposes of capsule production.

It is another object to measure abnormal changes in viscosity expressed as an analog and to convert the analog to a digital signal for incorporating digital increments of water into the dipping solution as required for viscosity control.

These and other objects, purposes and advantages of the invention will be seen from the following description and the accompanying drawing in which:

FIGURE 1 is a diagrammatic view of a capsule dipping dish and control means used for regulating dipping solution viscosity.

In the preferred embodiment illustrated, the dipping dish 10 is a container generally rectangular in cross-section having a central dipping compartment above a reservoir in conventional form. Located for delivery of gelatin solution into the reservoir is an aqueous gelatin supply 12 having automatic valve means 13 (activated by a micro-switch/air valve combination, not shown) adapted to open intermittently in phase with each dipping cycle to replenish the reservoir with a quantity of gelatin solution approximately equal to that consumed by each withdrawal of the pins from the dipping dish. Also arranged to deliver measured quantities of water to the dipping dish is a water supply line 15. A rotational viscometer apparatus 16 is provided for continuous measurement of the viscosity of the solution in the dipping dish. It has a viscometer spindle 17 held for concentric rotation by a cable 18 within the confines of a spindle guard 19. The viscometer 16 operates under air pressure from a constant-pressure supply 20 (e.g., 20 psi or 1.36 atmospheres) by way of line 21 through an orifice block 22 which communicates with the viscometer by way of air supply line 23. The orifice block 22 communicates by line 24 (under pressure which relates to and is a measure of the dipping solution viscosity) with a pressure transmitter 30 which in turn is also supplied with air from line 31. Whereas the working pressure range of the viscometer is low (e.g., between 9.65 to 65 inches of water or 18 to 121.4 mm. of mercury), the transmitter output operates at substantially higher pressure (e.g., between 3 to 15 psi or about 0.2 to 1.0 atmosphere). It serves to amplify the viscometer pressure signal (line 24) to a corresponding pressure in the mentioned higher range (e.g., 9 psi or 0.6 atmosphere). The amplified pressure is delivered by line 32 to a percentage controller 40 and to one of the paired bellows of a digital block 50. The controller 40 (supplied by air line 41) has a pressure output in the range from 3 to 15 psi (ca. 0.2 to 1.0 atmosphere) and is adjustable for delivering any selected fraction of the output range, e.g., 50 percent of 9 psi (0.6 atmosphere). Line 42 leads to the other one of the mentioned bellows of the digital block 50. The digital chamber of block 50 ties in with the air supply 20 by way of line 51 and also with an off/on water supply pressure valve 60 by way of line 52; it is designed to produce either a zero pressure signal or a 20 psi (1.36 atmospheres) digital signal depending on whether lines 32 and 42 (and their respective bellows) are at the same pressure or line 32 has a higher pressure, i.e., a positive imbalance. The water valve opens in response to the digital signal and delivers with each digital impulse a small increment of water through line 70 from water supply 71 (42.6 psi, 3 Kg./sq. cm., deionized). A reduction (needle) valve 80 is located between water lines 15 and 70 for controlling the quantity of water delivered with each digital impulse (preferably set for maximum flow required to override the system). The mentioned components are commercially available, for example, as follows: viscometer and orifice block, Brookfield (Viscocel VTA); pneumatic amplifier, Foxboro, Honeywell; controller, Foxboro (model M 40), Taylor, Honeywell; digital block, Taylor, Dreloba, Aro, Fluidix; water valve, Nupro.

Operation

For operating the control system of the invention, the dipping dish and reservoir 10 (preferably baffled for optimum liquid flow) are filled with dipping solution to a predetermined level with the dish pump in operation. The viscometer is activated and the dipping of the pins in normal fashion is initiated. As each set of pins is dipped into the dish and retracted the motion causes valve 13 to open so that a small quantity of aqueous gelatin solution (relatively more viscous) is delivered into the dish (preferably below the liquid level) to replenish the amount of dipping solution depleted with each withdrawal of the pins. Since this replenishment action tends to increase the average viscosity of the dipping solution, any such increase is correspondingly sensed by rotation of the viscometer spindle 17 causing a back pressure of air through line 23 which in turn is transmitted through line 24. The pressure signal received through line 24 is amplified to a higher value within the mentioned working range of 3 to 15 psi (ca. 0.2 to 1 atmos.). Assuming this amplified pressure, for example, is 9 psi (0.61 atmos.), the same is delivered by way of line 32 to one of the pair of bellows of digital block 50 and also to the controller 40. With the controller 40 preset, for example, to 50 percent, the air pressure delivered at line 41 is converted within the operating range of 3 to 15 psi to the midpoint of the range or 9 psi. In this case the output of the controller through line 42 to the digital pressure block 50 is substantially in balance with that delivered to the block by line 32, that is, both bellows are 9 psi. Where, however, the viscosity signal expressed as a pneumatic analog is greater than 9 psi, this is read as a positive imbalance. Since the digital block is sensitive to a small imbalance (for example, 0.1 psi or about 5.2 mm. of mercury), an imbalance of this magnitude serves to cause block 50 to transmit a digital pneumatic signal from line 51 via line 52 to the off/on water supply pressure valve 60 and opens the same. This causes a small increment of water to be impulsed through valve 60 which in turn results in the injection of a like amount of water in the reservoir 10 by transmission of pressure through lines 70 and 15 and valve 80. The quantity delivered is pre-set or controlled by preliminary adjustment of the reducing valve 80. The increment of water is mixed in the dipping dish 10 by normal pump action thereby slightly lowering the average liquid viscosity and so offsetting any viscosity increase such as is caused by the cyclical introduction of dipping solution from supply 12. As will be recognized, more than one such injection of water, and in fact several, may in some cases be required to dissipate the mentioned pressure imbalance in order to restore the desired average viscosity in the reservoir to the normal point predetermined for the operation. A preferred control valve 60 for operation at a dipping rate of 22 bars/minute, 20 size 3 pins/bar, is one rated at about 0.003 ml. constant volume output.

While the invention in viscosity control means has been described in considerable detail in the foregoing specification, it will be realized by those skilled in the art that wide variation can be made in such detail within the spirit of the invention claimed below. It is intended that the claims which follow be interpreted to cover both the invention particularly described and any such variation.

I claim:

1. An automatic capsule production machine comprising continuous viscometric means for sampling a body of aqueous capsule dipping solution and measuring viscosity variation from a predetermined range, means for amplifying and transmitting the measurement as a continuous pneumatic analog signal, means for balancing said signal with a predetermined pneumatic base signal, analog-to-digital conversion means operative whenever the analog signal exceeds the base signal to activate digital valve means, and water supply means for delivering an increment of water to the body of liquid whenever the valve means is activated.

2. An automatic capsule production machine having a viscosity control system according to claim 1 wherein the capsule dipping solution is contained in a capsule dipping dish.

3. A viscosity control system according to claim 2 wherein the system includes cyclical means for replenishing the dipping solution in phase with the dipping cycle.

* * * * *